United States Patent [19]

Heidrich

[11] Patent Number: 4,610,182
[45] Date of Patent: Sep. 9, 1986

[54] PLANETARY GEAR ARRANGED IN A GEAR HOUSING BETWEEN A JET ENGINE AND AN ELECTRICAL ENGINE

[75] Inventor: Günther Heidrich, Ortwang, Fed. Rep. of Germany

[73] Assignee: BHS-Bayerische Berg-Hutten -und Salzwerk AG, Munich, Fed. Rep. of Germany

[21] Appl. No.: 578,532

[22] Filed: Feb. 9, 1984

[30] Foreign Application Priority Data

Mar. 28, 1983 [DE] Fed. Rep. of Germany ....... 3311310

[51] Int. Cl.⁴ .............................................. F16H 1/28
[52] U.S. Cl. ..................................... 74/801; 60/39.31
[58] Field of Search ................. 74/801, 421 A, 421 R, 74/410, 411; 60/39.31, 39.07, 39.33, 39.183

[56] References Cited

U.S. PATENT DOCUMENTS

| 3,021,731 | 2/1962 | Stoeckicht | 74/801 |
| 3,088,278 | 5/1963 | Franz | 60/39.31 X |
| 3,258,995 | 7/1966 | Bennett et al. | 74/801 |
| 3,434,374 | 3/1969 | Barwig et al. | 74/801 |
| 3,459,072 | 8/1969 | Shannon | 74/801 |
| 3,462,949 | 8/1969 | Anderson et al. | 60/39.31 |
| 4,096,769 | 6/1978 | Horikiri et al. | 74/410 X |
| 4,249,431 | 2/1981 | Pruvot et al. | 74/410 X |

FOREIGN PATENT DOCUMENTS

| 205552 | 1/1957 | Australia | 74/801 |
| 245715 | 7/1965 | Austria . | |
| 1295948 | 5/1969 | Fed. Rep. of Germany | 74/801 |
| 1214517 | 4/1960 | France | 74/801 |
| 0013245 | 1/1983 | Japan | 74/801 |
| 612709 | 11/1948 | United Kingdom | 60/39.33 |
| 664297 | 1/1952 | United Kingdom | 74/801 |
| 1444778 | 8/1975 | United Kingdom | 74/801 |

*Primary Examiner*—Kenneth J. Dorner
*Assistant Examiner*—Dirk Wright
*Attorney, Agent, or Firm*—Silverman, Cass, Singer & Winburn, Ltd.

[57] ABSTRACT

The planetary gear comprises a sun wheel seated on an impeller shaft of a jet engine, planet wheels rotatable on bearing pins which are clamped at one side, and a hollow wheel ring gear. As a result of centering by the planet wheels, the sun wheel provides a bearing for the impeller shaft and the hollow wheel provides a bearing for a slow shaft of an electrical engine. Another bearing for the slow shaft may be designed as a radial/axial bearing arranged in the gear housing. The hollow wheel 10 itself is radially elastic and is fastened to the shaft by way of a thin-walled annular extension.

5 Claims, 3 Drawing Figures

PLANETARY GEAR ARRANGED IN A GEAR HOUSING BETWEEN A JET ENGINE AND AN ELECTRICAL ENGINE

TECHNICAL FIELD

This invention relates to a planetary gear arranged in a gear housing between a jet engine and an electrical engine, and comprising a sun wheel seated on an impeller shaft of the jet engine, planet wheels which are rotatable on bearing pins clamped at one side, and a planet wheel carrier which is connected to a slow, running shaft, in which respect the sun wheel, being centred by the planet wheels, forms a bearing for the impeller shaft.

BACKGROUND ART

A planetary gear of the aforementioned type is already known in which the sun wheel is mounted in the planet wheel carrier which, for its part, provides a two-sided mounting for the planet wheel pins. This construction is complex and expensive to produce and as a result of the numerous bearings, entails fairly high friction losses.

Also known is a rotary blower or a rotary compressor incorporating a planetary gear (AT-PS No. 245 715). In this arrangement, one end of the impeller shaft is designed as a pinion and acts as the sun wheel of a planetary gear having helical gearing which has three or more planet wheels. These planet wheels rotate on the trunnions of a stationary planet wheel carrier. A hollow wheel with internal toothing is mounted only in toothed engagement with the planet wheels. Connection to an electric motor is achieved by way of a movable toothed clutch or gear coupling. In this respect one half of the toothed clutch is formed by the hollow wheel, whereas the other half of the toothed clutch is securely keyed onto the free end of the shaft of the electric motor. Thus there is considerable structural complexity and the bearings of the electric motor also have to be used to carry one half of the movable toothed clutch.

The object of the present invention is to provide a planetary gear of the type mentioned at the beginning which is simpler in construction and is more effective than known gears of this type.

SUMMARY OF THE INVENTION

This object is achieved in accordance with the invention in that in a planetary gear of the aforementioned type (a) as a result of the centering of the planet wheels, the hollow wheel forms a bearing for the slow shaft, (b) the hollow wheel is radially elastic in design, and (c) the hollow wheel is fastened to the slow shaft by way of a thin-walled annular extension.

In this way a planetary gear is advantageously provided for a special range of applications in a compact mode of construction, and, as a result of the reduced number of bearings and the reduced structural complexity, a reduction in costs, friction losses and overall length is achieved.

In one favourable embodiment of the planetary gear of the invention another bearing for the slow shaft is provided as a radial and/or axial bearing arranged in the gear housing.

In another favourable embodiment, the gear housing is connected to the housing of the electrical engine by way of concentric centerings, and another bearing for the slow shaft is provided by a bearing on the electrical engine.

The invention will be described further, by way of example, with reference to the accompanying drawings, in which:

DETAILED DESCRIPTION OF THE ILLUSTRATED EMBODIMENTS

Figure 1:
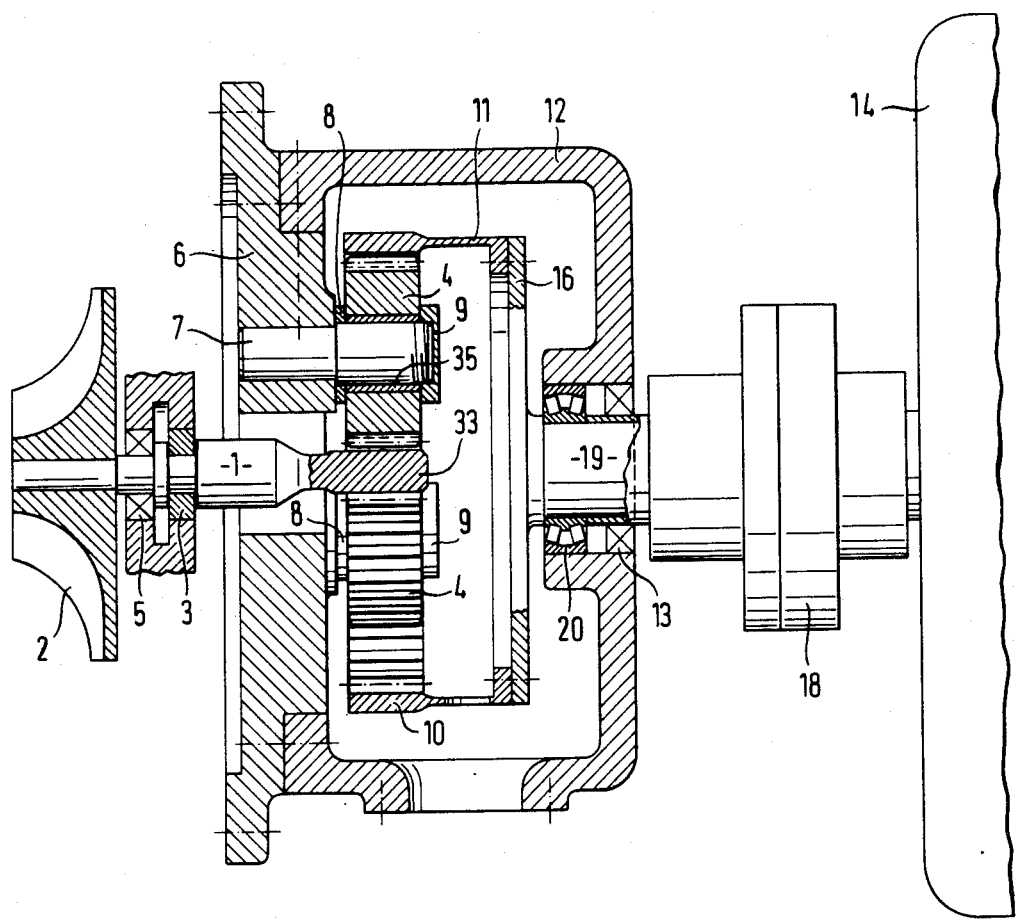
FIG. 1 is a schematic side view, partially in cross-section, of a first embodiment of a planetary gear in accordance with the invention, namely a straight or spur toothed planetary gear of free-standing construction.
Figure 2:
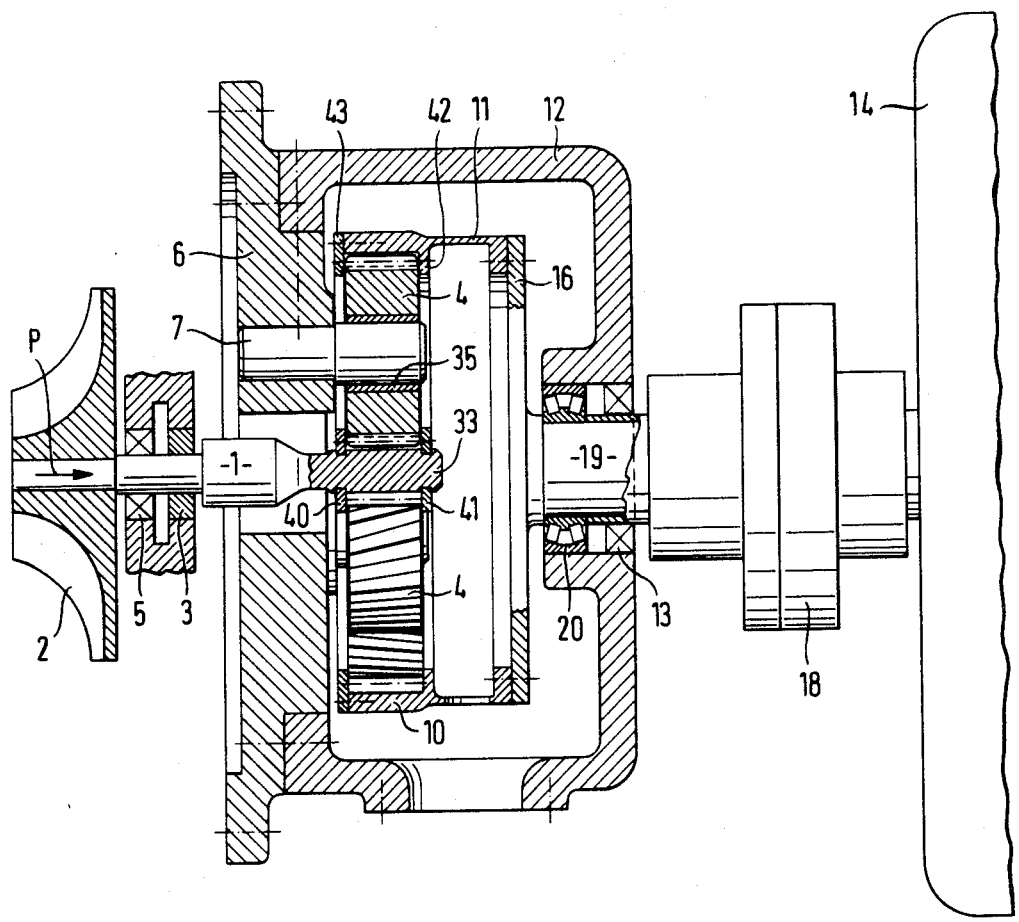
FIG. 2 is a similar view of a second embodiment of the invention, namely a single-helical-toothed planetary gear of free-standing construction.

Two different embodiments of the planetary gear of the invention, both of a free-standing type of construction, are illustrated in FIGS. 1 and 2. In this respect, the housing 12 surrounding the gear can be fastened by way of feet arranged directly on the housing 12 or it can be flange-mounted on a housing of a jet engine by way of an installation part provided for this purpose. A clutch 18 is disposed between electrical generator 14 and the planetary gear. This clutch 18 compensates for shaft displacements and can, depending on requirements, be torsionally-stiff or torsionally-elastic.

The straight-toothed planetary gear shown in FIG. 1 comprises a sun wheel 33, planet wheels 4 which are mounted by way of planet wheel pins 7 on a stationary planet wheel carrier 6, and a hollow wheel ring gear 10. The sun wheel 33 is arranged on an impeller shaft 1 which carries an impeller 2 of the jet engine. The impeller shaft 1, the impeller 2 and the sun wheel 33 together form one unit. This shaft 1 is guided radially and axially in a bearing 3 and it is also guided by the toothed engagement of the sun wheel 33 with the planet wheels 4. Adjacent the bearing 3 for the impeller shaft 1 there is a seal 5.

The housing 12 of the planetary gear is sealed on the left-hand side in FIG. 1 by a housing flange which also forms the planet carrier. The bearing pins 7 for the planet wheels 4 are clamped on one side of this planet carrier 6. Preferably, sliding bearings 35 are provided for the planet wheels 4 on the pins 7. Axial guidance of the planet wheels 4 is accomplished by buffer discs or washers 8 and 9.

The hollow wheel 10 is designed so as to be radially elastic so that the uniform power transfer in the planetary gear is improved and an arrangement including more than three planet wheels is possible.

The hollow wheel 10 is connected by way of a thin-walled annular extension 11 to a flange 16 of a slow-running shaft 19 of an electrical engine 14. The slow gear shaft 19 is connected rigidly to the hollow wheel 10 by way of expansion screws (not shown). This shaft 19 is guided in a roller bearing 20, for example an angularly-movable self-aligning roller bearing and, similarly to the impeller shaft 1, it is also guided by toothed engagement between the hollow wheel 10 and the planet wheels 4. A seal 13 serves to seal off housing 12 at the slow gear side.

Straight or spur toothing is provided in the case of the planetary gear shown in FIG. 1. The particular toothing geometry ensures accurate centring of the sun wheel 33 and the hollow wheel 10 respectively, high carrying capacity (bearing strength) and good dynamic behaviour. Any deformations are compensated for by profile and longitudinal corrections.

The tooth flanks of the planet wheels 4 are slightly rounded or crowned so that the toothed engagements are somewhat flexible. In other words, this measure avoids excessive specific loadings at the tooth ends, which might arise as a result of axis displacements (due to slight errors of production or alignment) between the planet wheel carrier 6 and the impeller shaft 6 or the slow shaft 19 respectively.

In particular cases it can be advantageous to provide a single-helical-toothing on the sun wheel 33, on the planet wheels 4 and on the hollow wheel 10, as shown in FIG. 2), instead of the straight-toothed planetary gear shown in FIG. 1. In this case, thrust rings 40 and 41 are fastened to the sun wheel 33 and thrust rings 42 and 43 are fastened to the hollow wheel 10.

These aforementioned thrust rings serve to compensate for the axial force components which arise with this sort of tooth arrangement. They are also capable of transmitting axial forces, introduced into the gear from the outside to the opposite side by way of the wheel set without the toothings being additionally loaded. If, for example, an axial thrust P acts on the sun wheel 33 from the impeller 2, the thrust rings 40, the planet wheels 4 and the thrust rings 42 transmit this axial thrust to the slow gear side. The transmission of these axial forces is effected at the thrust rings by a low-friction rolling movement.

In the case of high speeds of rotation and great axial thrusts at the fast side (the side of the impeller shaft 1), the construction in accordance with FIG. 2, has the following advantages. The axial part, of the bearing 3, which would be highly loaded in such cases, can be dispensed with. External axial thrusts are transmitted in a low-loss manner by way of the thrust rings 40 and 42 or 41 and 43 respectively to the slow side and are absorbed there without any problems by the existing axial/radial bearing 20. The noise behaviour of the helical toothing is better than that of the straight or spur toothing.

Buffer discs or washers are not necessary, since the planet wheels 4 are guided by the thrust rings in the construction shown in FIG. 2.

Figure 3:
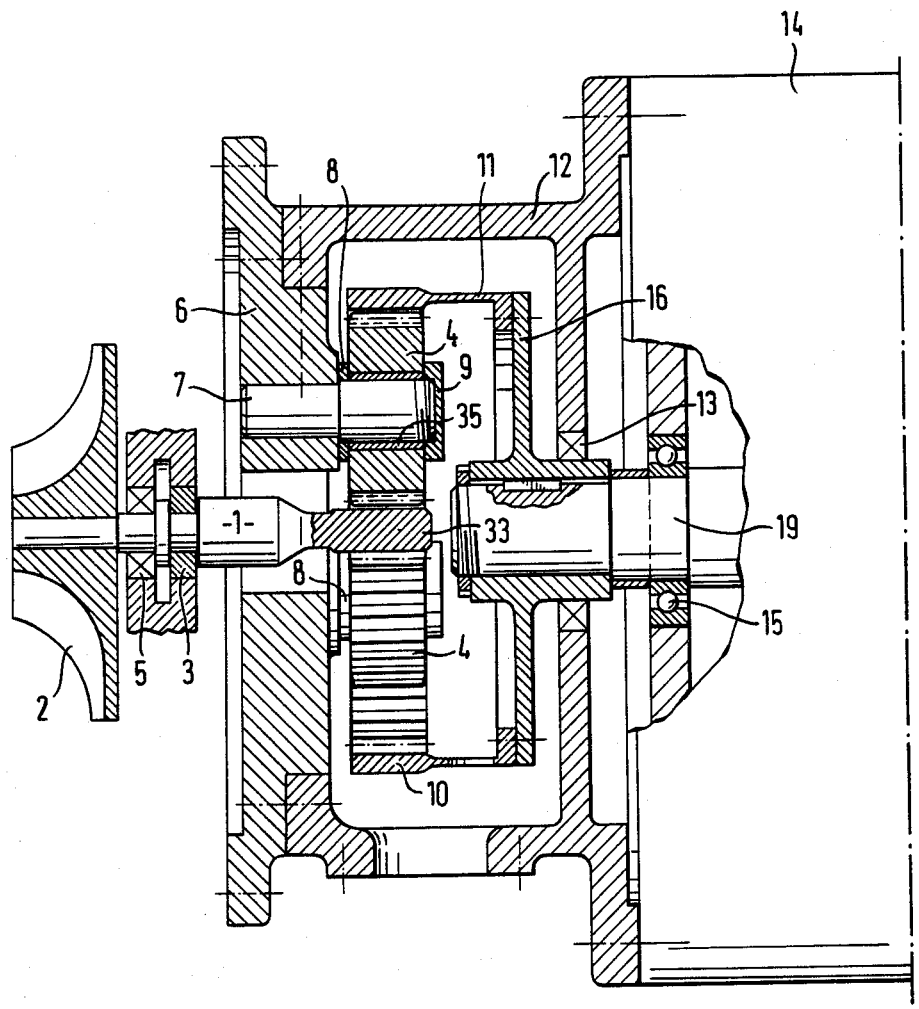
FIG. 3 is a similar view of a third embodiment of the invention, namely a straight-toothed planetary gear of flange mounted construction.

Single-helical toothing can also be employed in a flange-mounted type of construction, similar to that shown in FIG. 3, and with the mounting of the slow shaft as shown there.

FIG. 3 illustrates a planetary gear of the invention of flange-mounted type of construction for attachment to the electrical engine 14. In this respect, roller bearings 15 which possess, in the operating state, a very small radial clearance are provided for mounting the shaft 19 of the electrical engine 14. This results in almost play-free concentric guidance of the slow shaft 19 which makes it possible to connect the hollow wheel 10 rigidly, by way of a thin-walled flexible annular extension 11, to the flange 16 by way of expansion screws (not shown). In this way, the number of shaft bearings is reduced and there are smaller bearing friction losses and lower production costs and the overall length is shortened.

In the case of all three types of construction, only one sliding bearing 3 is provided for guidance of the impeller shaft 1. As a result of no longer providing a second sliding bearing at the slow-running gearing side (as is present in the prior art) the bearing friction losses are reduced quite considerably and a higher gearing efficiency is thus achieved.

In FIG. 3, the bearing pins 7 for the planet wheels 4 project from the planet wheel carrier 6, which can also provide a housing flange. Compared with the conventional planet wheel carrier construction as a cage with two side discs and connecting webs, this construction results in a reduction in production costs, a simpler wheel set mounting, a rapid and low-friction removal of lubricating oil from the wheel set and thus a further increase in the efficiency.

In all types of construction the housing 12 can also be horizontally divided.

The straight toothing in the embodiments shown in FIGS. 1 and 3, permits a very simple mounting and dismounting of parts for assembly, alignment and inspection. The alignment of the jet engine is dispensed with as a result of concentric centerings. In the embodiment shown in FIG. 3, the alignment with regard to the engine 14 is obviated.

The sun wheel 33 can be removed without dismantling the gear, for example for mounting of the curvature impeller, for balancing and for tooth inspection.

After separation of the planet wheel carrier 6 from the housing, the gear may be rapidly taken apart into its essential constituent parts. All the parts are easily accessible for inspection and for repairs. The re-assembly of the gear is also very simple, as a result of the concentric centering of the wheels.

I claim:

1. A planetary gear transmission mounted in a gear housing between a jet engine having a high speed impeller shaft and an electric generator having a slow speed shaft comprising, a sun gear fixed on said impeller shaft, a stationary planet carrier, a plurality of planet gears, each planet gear being mounted for rotation on a bearing pin fixed to said carrier, said planet gears being arranged around said sun gear and in mesh therewith, and a hollow wheel ring gear having internal teeth arranged around said planet gears and in mesh therewith, said ring gear having a thin-walled annular extension connected to said slow speed shaft for imparting motion thereto and to provide a predetermined amount of radial elasticity, said sun gear and planet gears together defining a bearing for the impeller shaft and said hollow wheel ring gear serving as a supporting bearing for said slow speed shaft, and additional bearing means in said gear housing for said slow speed shaft.

2. A planetary gear transmission as defined in claim 1, wherein the additional bearings means for the slow speed shaft comprises a roller bearing.

3. A planetary gear transmission mounted in a gear housing between a jet engine having a high speed impeller shaft and an electric generator having a slow speed shaft comprising a sun gear fixed on said impeller shaft, a stationary planet carrier a plurality of planet gears, each planet gear being mounted for rotation on a bearing pin fixed to said carrier, said planet gears being arranged around said sun gear and in mesh therewith, and a hollow wheel ring gear having internal teeth arranged around said planet gears and in mesh therewith, said ring gear having a thin-walled annular extension connected to said slow speed shaft for imparting motion thereto and to provide a predetermined amount of radial elasticity, said sun gear and planet gears together forming a bearing for the impeller shaft and said hollow wheel ring gear seving as a supporting bearing for said slow speed shaft, and additional bearing means on said generator for said slow speed shaft.

4. A planetary gear transmission as defined in claim 1, wherein said sun gear and planet gears have helical gear teeth and further including annular thrust ring means at each end of said sun gear and on said hollow wheel ring gear adjacent each end of said planet gears.

5. A planetary gear transmission as defined in claim 1, wherein the gear teeth of the planet gears are crowned.

* * * * *